United States Patent [19]
Ishiguro et al.

[11] Patent Number: 4,741,206
[45] Date of Patent: May 3, 1988

[54] VEHICLE HEIGHT DETECTING SYSTEM

[75] Inventors: Yoshinori Ishiguro, Chiryu; Kohji Kamiya, Chita; Kiyoshi Miyake; Hideki Kabune, both of Kariya; Noriyuki Nakashima, Nagoya; Masami Itou, Toyota, all of Japan

[73] Assignees: Nippondenso Co., Ltd., Kariya; Toyota Jidosha Kabushiki Kaisha, Toyota, both of Japan

[21] Appl. No.: 942,082

[22] Filed: Dec. 15, 1986

[30] Foreign Application Priority Data

Dec. 16, 1985 [JP] Japan ................................ 60-282607

[51] Int. Cl.$^4$ ........................................ G01M 17/04
[52] U.S. Cl. .................................... 73/118.1; 340/686
[58] Field of Search ...................... 73/118.1, 1 J, 1 D; 280/6 R, 6 H, DIG. 1; 340/686

[56] References Cited

U.S. PATENT DOCUMENTS 3,628,371  12/1971  Moore et al. ........................ 73/1 D

FOREIGN PATENT DOCUMENTS 164213  9/1984  Japan ................................ 280/6 R Primary Examiner—Jerry W. Myracle
Attorney, Agent, or Firm—Cushman, Darby & Cushman

[57] ABSTRACT

A vehicle height sensor includes switching circuits which are turned on and off in accordance with height of a vehicle. The vehicle height sensor is driven when a drive signal is outputted to the sensor. A preset voltage is fed to terminals of the respective switching circuits via resistors. Voltages at the terminals are outputted as vehicle height data having bits corresponding to the respective switching circuits. When the output of the drive signal is suspended, the vehicle height data are read as vehicle height sensor malfunction detecting data. The malfunction detecting data are compared to preset reference data. The vehicle height sensor is judged to be wrong when the malfunction detecting data differ from the preset reference data.

7 Claims, 6 Drawing Sheets

VEHICLE HEIGHT DETECTING SYSTEM

BACKGROUND OF THE INVENTION

This invention relates to a system for detecting the height of a vehicle, such as an automotive vehicle.

Some automotive vehicle height control systems or levelling systems have a sensor generating a signal representative of the vehicle height. Vehicle height varying devices are controlled in accordance with this vehicle height signal so that the vehicle height can be maintained within a desired range. Advanced vehicle height sensors generate multi-bit digital signals.

Japanese published unexamined utility model application No. 60-34911 discloses a system for detecting a malfunction of a vehicle height sensor of the digital output type. A preset state or states of the digital vehicle height signal are allotted for indications of a malfunction of the vehicle height sensor. The other or remaining states of the digital signal are used to indicate the vehicle height. The allotment of a portion of the states of the digital signal for the detection of a malfunction reduces the number of the states of the digital signal usable for the vehicle height detection and thus decreases the resolving power of the vehicle height detection.

SUMMARY OF THE INVENTION

It is an object of this invention to provide a vehicle height detecting system which has an adequate resolving power of vehicle height detection and also which can detect a malfunction of a vehicle height sensor.

In a vehicle height detecting system according to a first aspect of this invention, a vehicle height sensor includes switching circuits which are turned on and off in accordance with height of a vehicle. The vehicle height sensor is driven when a drive signal is outputted to the sensor. A preset voltage is fed to terminals of the respective switching circuits via resistors. Voltages at the terminals are outputted as vehicle height data having bits corresponding to the respective switching circuits. When the output of the drive signal is suspended, the vehicle height data are read as vehicle height sensor malfunction detecting data. The malfunction detecting data are compared to preset reference data. The vehicle height sensor is judged to be wrong when the malfunction detecting data differ from the preset reference data.

In a system according to a second aspect of this invention, a sensor detects height of a vehicle. The vehicle height sensor is selectively activated and deactivated. A condition of the vehicle height sensor is monitored when the sensor is deactivated. A malfunction of the vehicle height sensor is detected on the basis of the monitored condition of the sensor.

DESCRIPTION OF THE PREFERRED EMBODIMENT

Figure 1:
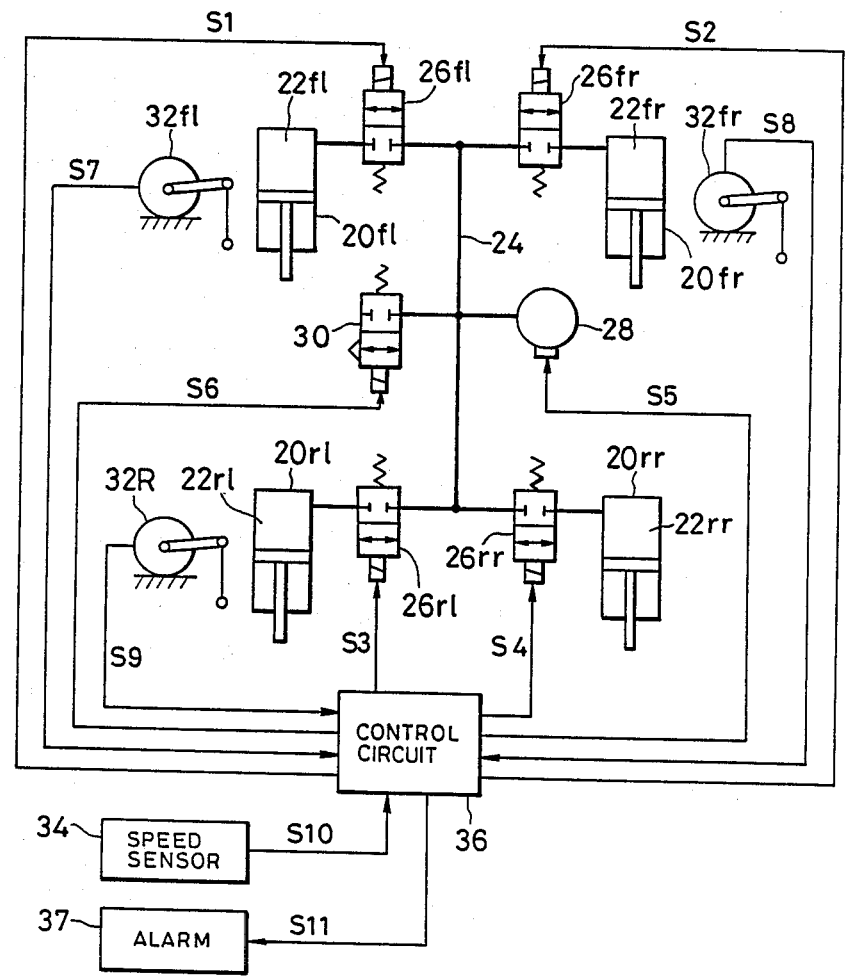
FIG. 1 is a diagram of a vehicle height control arrangement including a vehicle height detecting system according to an embodiment of this invention.

Referring to FIG. 1, there is shown an arrangement designed to control the height of an automotive vehicle in accordance with the vehicle speed and the degree of unevenness of road surfaces.

As shown in FIG. 1, the vehicle height control arrangement includes adjustable air or pneumatic suspensions 20fl, 20fr, 20rl, and 20rr mechanically connected between the vehicle body and vehicle wheel suspension arms. The air suspensions 20fl, 20fr, 20rl, and 20rr are associated with the left-hand front wheel, the right-hand front wheel, the left-hand rear wheel, and the right-hand rear wheel respectively. The air suspensions 20fl, 20fr, 20rl, and 20rr expand and contract as air is supplied to and released from respective air chambers 22fl, 22fr, 22rl, and 22rr within the suspensions. The height of the vehicle body relative to the wheel axles or the road surfaces varies in accordance with expansion and contraction of the air suspensions 20fl, 20fr, 20rl, and 20rr.

The suspension air chamber 22fl is selectively connected to and disconnected from an air pipe arrangement 24 by a solenoid valve 26fl. The solenoid valve 26fl moves between open and closed positions when a control signal S1 applied to the valve 26fl electrically energizes and de-energizes the valve 26fl. The suspension air chamber 22fr is selectively connected to and disconnected from the air pipe arrangement 24 by a solenoid valve 26fr. The solenoid valve 26fr moves between open and closed positions when a control signal S2 applied to the valve 26fr electrically energizes and de-energizes the valve 26fr. The suspension air chamber 22rl is selectively connected to and disconnected from the air pipe arrangement 24 by a solenoid valve 26rl. The solenoid valve 26rl moves between open and closed positions when a control signal S3 applied to the valve 26rl electrically energizes and de-energizes the valve 26rl. The suspension air chamber 22rr is selectively connected to and disconnected from the air pipe arrangement 24 by a solenoid valve 26rr. The solenoid valve 26rr moves between open and closed positions when a control signal S4 applied to the valve 26rr electrically energizes and deenergizes the valve 26rr. A compressor 28 connected to the air pipe arrangement 24 serves to supply compressed air into the pipe arrangement 24. A control signal S5 applied to the compressor 28 activates and deactivates the latter. An air discharge solenoid valve 30 selectively connects and disconnects the air pipe arrangement 24 to and from atmosphere. The air discharge solenoid valve 30 moves between open and closed positions when a control signal S6 applied to the valve 30 electrically energizes and de-energizes the valve 30. In the case where the compressor 28 is activated, when the air discharge solenoid valve 30 disconnects the air pipe arrangement 24 from atmosphere and the solenoid valves 26fl, 26fr, 26rl, and 26rr connects the suspension air chambers 22fl, 22fr, 22rl, and 22rr to the air pipe arrangement 24, compressed air moves into the suspension air chambers so that the air suspensions 20fl, 20fr, 20rl, and 20rr usually expand. When the air discharge solenoid valve 30 connects the air pipe arrangment 24 to atmosphere and the solenoid valves 26*fl*, 26*fr*, 26*rl*, and 26*rr* connect the suspension air chambers 22*fl*, 22*fr*, 22*rl*, and 22*rr* to the air pipe arrangement 24, air escapes from the suspension air chambers into atmosphere so that the air suspensions 20*fl*, 20*fr*, 20*rl*, and 20*rr* usually contract. When the solenoid valves 26*fl*, 26*fr*, 26*rl*, and 26*rr* disconnect the suspension air chambers 22*fl*, 22*fr*, 22*rl*, and 22*rr* from the air pipe arrangement 24, amounts of air held within the suspension air chambers remain essentially constant so that the time-averaged or effective lengths of the air suspensions 20*fl*, 20*fr*, 20*rl*, and 20*rr* also remain essentially constant. It should be noted that the lengths of the air suspensions 20*fl*, 20*fr*, 20*rl*, and 20*rr* change or fluctuate when the vehicle body vibrates relative to the vehicle wheel axles.

A position sensor 32*fl* generates a signal S7 representing the height of the vehicle body relative to the left-hand front wheel axle. A position sensor 32*fr* generates a signal S8 representing the height of the vehicle body relative to the right-hand front wheel axle. A position sensor 32R generates a signal S9 representing the height of the vehicle body relative to the left-hand rear wheel axle.

A speed sensor 34 generates a signal S10 representing the speed of the vehicle.

An electronic control circuit 36 connected to the sensors 32*fl*, 32*fr*, 32R, and 34 receives the vehicle height signals S7–S9, and the vehicle speed signal S10. The control circuit 36 determines a desired range of the vehicle height in accordance with conditions of the vehicle, such as road conditions and the vehicle speed, derived from the signals S7–S10. The control circuit 36 generates the control signals S1–S6 applied to the solenoid valves 26*fl*, 26*fr*, 26*rl*, 26 *rr*, and 30, and the compressor 28 via connections of the control circuit to those devices. The control signals S1–S6 are adjusted in accordance with the desired range of the vehicle height so that the actual vehicle height essentially remains within the desired range.

A visual or audible alarm 37, such as a lamp indicator, is activated and deactivated by a control signal S11 applied to the device 37.

The control circuit 36 generates the control signal S11 applied to the alarm 37 via a connection of the control circuit 36 to the device 37. As will be made clear hereinafter, the control circuit 36 determines or detects whether or not at least one of the vehicle height sensors 32*fl*, 32*fr*, and 32R malfunctions by checking states or conditions of the vehicle height sensors when they are inactive. When a malfunction of at least one of the vehicle height sensors is detected, the control circuit 36 activates the alarm 37 via the control signal S11.

Figure 2:
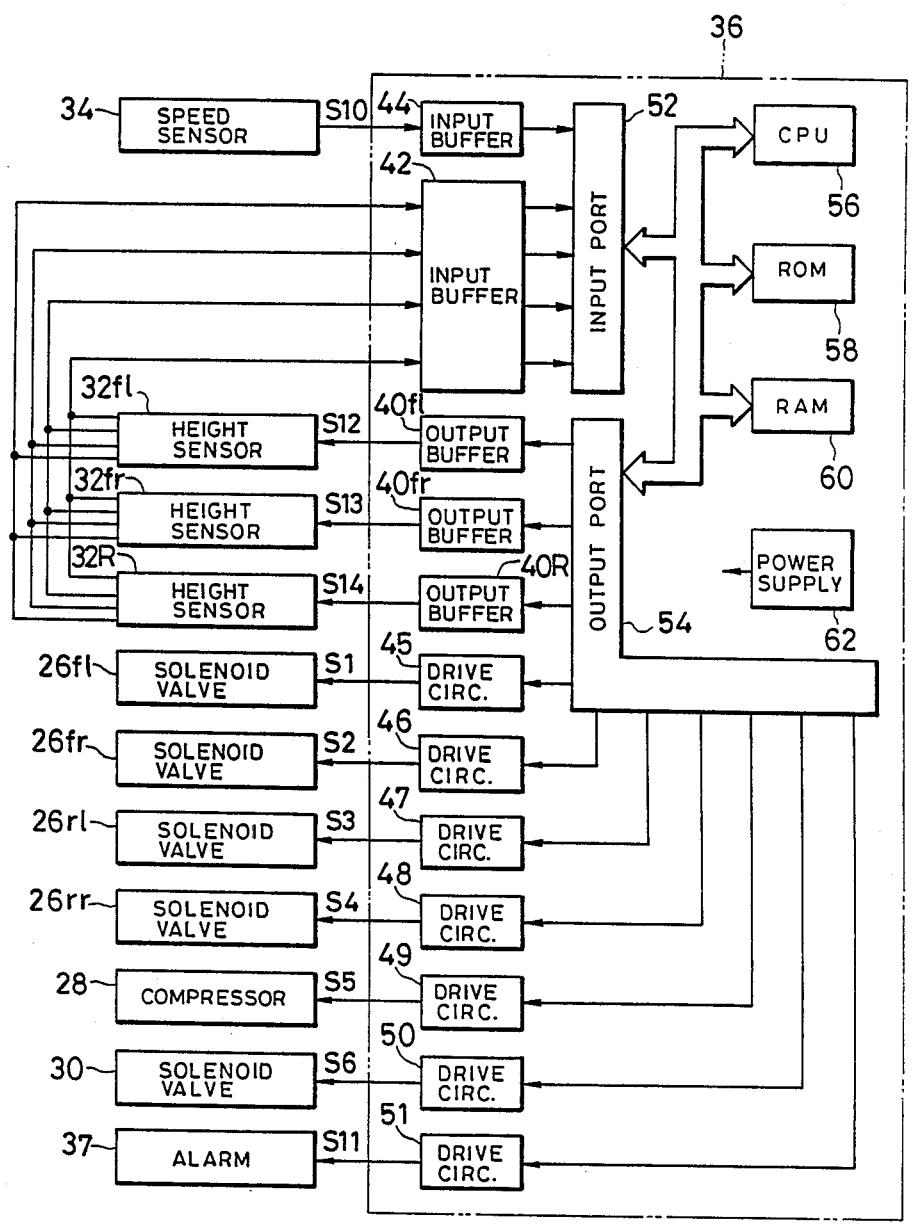
FIG. 2 is a block diagram of the vehicle height control arrangement of FIG. 1 and shows the internal structure of the control circuit.

As shown in FIG. 2, the control circuit 36 includes output buffers 40*fl*, 40*fr*, and 40R connected to the vehicle height sensors 32*fl*, 32*fr*, and 32R respectively. It should be noted that these connections between the output buffers and the vehicle height sensors are omitted from FIG. 1. The output buffers 40*fl*, 40*fr*, and 40R feed drive signals S12, S13, and S14 to the vehicle height sensors 32*fl*, 32*fr*, and 32R respectively. The vehicle height sensors 32*fl*, 32*fr*, and 32R are similar to each other except for the locations. Each of the vehicle height signals S7–S9 (see FIG. 1) has four bits. Each of the vehicle height sensors 32*fl*, 32*fr*, and 32R includes four output terminals corresponding to the four bits of the vehicle height signals S7–S9. The four output terminals of each vehicle height sensor are connected to an input buffer 42 within the control circuit 36 via separate four lines to feed the vehicle height signal to the input buffer 42. The first output terminals of the vehicle height sensors 32*fl*, 32*fr*, and 32R are connected in common to the first connecting line. The second output terminals of the vehicle height sensors are connected in common to the second connecting line. The third output terminals of the vehicle height sensors are connected in common to the third connecting line. The fourth output terminals of the vehicle height sensors are connected in common to the fourth connecting line.

The control circuit 36 includes an input buffer 44 connected to the vehicle speed sensor 34 to receive the vehicle speed signal S10.

Drive circuits or driver 45, 46, 47, and 48 within the control circuit 36 are connected to the solenoid valves 26*fl*, 26*fr*, 26*rl*, and 26*rr* respectively. The drive circuits 45, 46, 47, and 48 feed the control signals S1, S2, S3, and S4 to the solenoid valves 26*fl*, 26*fr*, 26*rl*, and 26*rr* respectively.

A drive circuit or driver 49 within the control circuit 36 is connected to the compressor 28. The drive circuit 48 feeds the control signal S5 to the compressor 28.

A drive circuit or driver 50 within the control circuit 36 is connected to the air discharge solenoid valve 30. The drive circuit 50 feeds the control signal S6 to the air discharge solenoid valve 30.

A drive circuit or driver 51 within the control circuit 36 is connected to the alarm 37. The drive circuit 51 feeds the control signal S11 to the alarm 37.

The control circuit 36 includes a microcomputer system having the combination of an input port 52, an output port 54, a central processing unit (CPU) 56, a read-only memory (ROM) 58, and a random-access memory (RAM) 60. The input port 52 is connected to the input buffers 42 and 44 to receive the data representing the vehicle heights and the vehicle speed. The output port 54 is connected to the output buffers 40*fl*, 40*fr*, 40R, and the drive circuits 45–51 to feed primary control signals to these devices. The primary control signals determine the corresponding secondary control signals S1–S6, and S11.

The control circuit 36 includes a power supply circuit 62 which is connected to the various devices within the control circuit 36 to supply electrical power to them. It should be noted that the connections of the power supply circuit 62 to the devices are omitted from FIG. 2.

The vehicle height sensors 32*fl*, 32*fr*, and 32R have similar internal designs. The internal design of the vehicle height sensor 32*fl* will be described hereinafter with reference to FIGS. 3 and 4. Description of the internal designs of the other vehicle height sensors is omitted.

Figure 3:
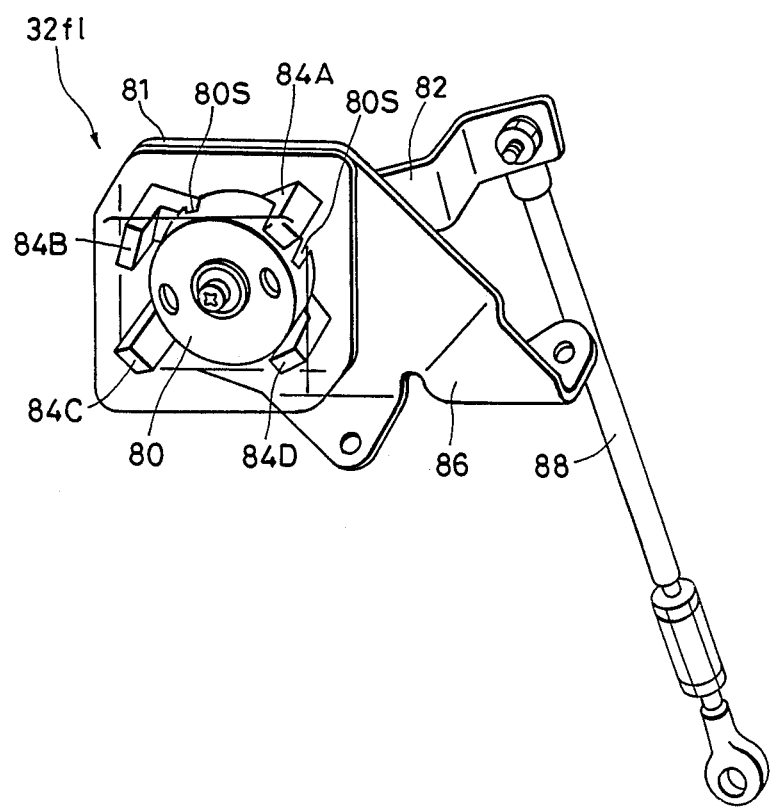
FIG. 3 is a perspective view of the vehicle height sensor of FIGS. 1 and 2.

As shown in FIG. 3, the vehicle height sensor 32*fl* includes a disc 80 rotatably supported on a base 81, a lever 82 connected to the disc 80, and four photo-interrupters 84A, 84B, 84C, and 84D fixedly mounted on the base 81. The disc 80 rotates about its axis in accordance with movement of the lever 82. The disc 80 has a circumferential wall formed with angularly separated slits 80S. Each of the photo-interrupters 84A–84D includes a U-shaped frame or support having parallel portions to which a light-emitting diode and a phototransistor are mounted respectively. The light-emitting diode and the phototransistor oppose each other so that they form a photocoupler. Provided that an optical path connecting the diode and the phototransistor is unblocked, light travels from the diode to the phototransistor via the optical path. The circumferential wall of the disc 80 extends between the parallel portions of each of the photo-interrupters 84A-84D. The optical path between the light-emitting diode and the phototransistor in each of the photo-interrupters 84A-84D is blocked by the circumferential wall of the disc 80 when the disc 80 rotates and the slit 80S moves out of essential alignment with the light-emitting diode and the phototransistor. The optical path is unblocked when the disc 80 rotates and the slit 80S moves into essential alignment with the light-emitting diode and the phototransistor. Each of the photo-interrupters 84A-84D constitutes a switch which is chaged between an ON state and an OFF state, that is, which is turned on and off, in accordance with blocking and unblocking of the optical path. In this way, the states of the photo-interrupters 84A-84D vary as a function of the angular position of the disc 80 relative to the base 81.

The base 81 is fixed to the vehicle body by means of a bracket or attachment member 86. The lever 82 is connected to the vehicle wheel suspension arm. Accordingly, the disc 80 rotates as the height of the vehicle body relative to the vehicle wheel axle varies. Thus, the states of the photo-interrupters 84A-84D change in accordance with the height of the vehicle body relative to the vehicle wheel axle.

Specifically, the range of the vehicle height between its upper and lower limits is preferably divided into 16 portions. The configuration of the slits 80S and the photo-interrupters 84A-84D is preferably designed so that the 16 different states of the combination of the four switches composed of the photo-interrupters 84A-84D correspond to the 16 portions of the vehicle height range. As will be made clear hereinafter, the vehicle height signal S7 from the sensor 32$fl$ has independent bits corresponding to the photo-interrupters 84A-84D respectively. The vehicle height signal S7 preferably changes among 16 different states as the vehicle height moves between its upper and lower limits.

Figure 4:
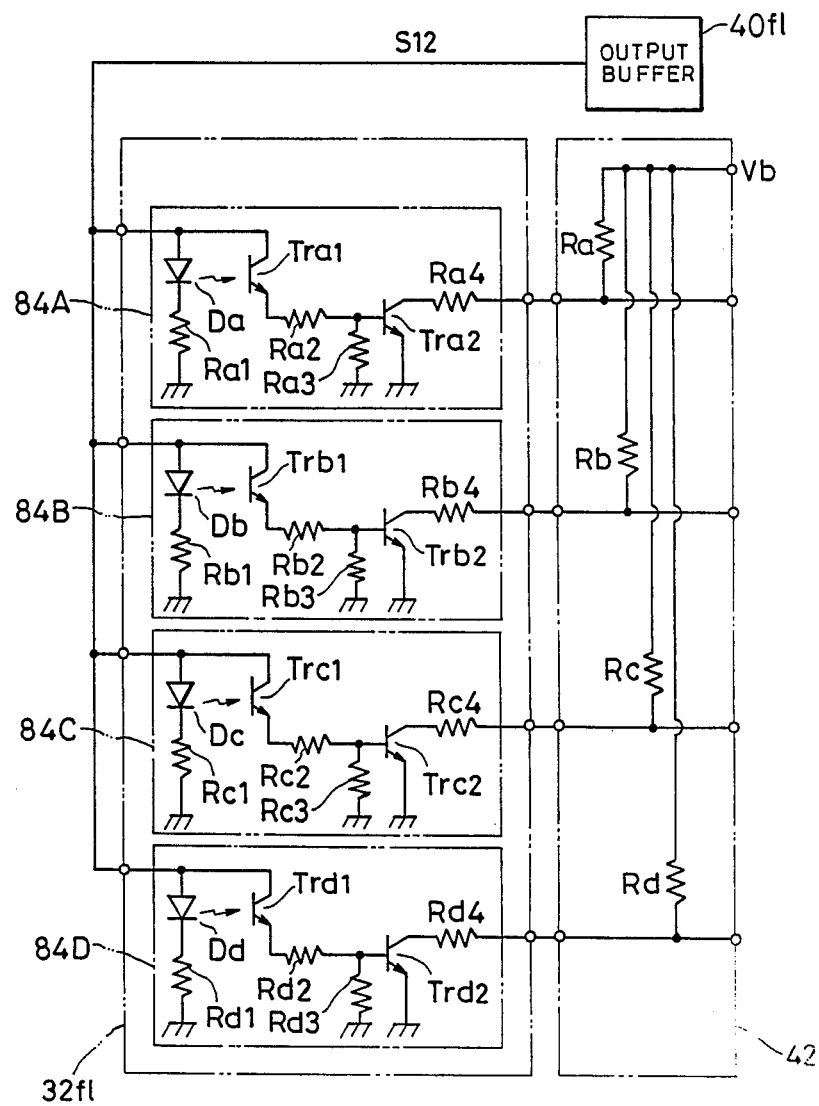
FIG. 4 is a schematic diagram of an electrical portion of the vehicle height sensor and the associated input buffer in FIG. 2.

As shown in FIG. 4, the photo-interrupter 84A includes a pair of a light-emitting diode Da and a phototransistor Tra1. The anode of the diode Da is connected to a positive output terminal of the buffer 40$fl$. The cathode of the diode Da is grounded via a fixed resistor Ra1. A negative output terminal of the buffer 40$fl$ is also grounded. The collector of the phototransistor Tra1 is connected to the positive output terminal of the buffer 40$fl$. The emitter of the phototransistor Tra1 is grounded via a series combination of fixed resistors Ra2 and Ra3. The photo-interrupter 84A includes an NPN transistor Tra2 whose base is connected to the junction between the resistors Ra2 and Ra3. The emitter of the transistor Tra2 is grounded. The collector of the transistor Tra2 is connected via a fixed resistor Ra4 to a first output terminal of the vehicle height sensor 32$fl$ which is coupled to a first input terminal of the buffer 42.

When the output buffer 40$fl$ generates a drive signal S12, a current flows through the diode Da so that the diode Da emits light. Provided that the optical path between the diode Da and the phototransistor Tra1 is unblocked by the slit 80S (see FIG. 3), the light emitted from the diode Da reaches the phototransistor Tra1 and thus the phototransistor Tra1 becomes conductive. Accordingly, a current passes through the phototransistor Tra1 and a portion of the current flows through the base-emitter path of the transistor Tra2 so that the transistor Tra2 becomes conductive or moves into an ON state. In the case where the light path between the diode Da and the phototransistor Tra1 is blocked by the disc 80 (see FIG. 3), the light emitted from the diode Da fails to reach the phototransistor Tra1 so that the phototransistor Tra1 remains unconductive and thus the transistor Tra2 also remains unconductive or in an OFF state.

When a drive signal S12 is absent, the diode Da does not emit light and the phototransistor Tra1 remains unconductive so that the transistor Tra2 also remains unconductive or in the OFF state.

The photo-interrupter 84B includes a light-emitting diode Db, a phototransistor Trb1, an NPN transistor Trb2, and fixed resistors Rb1, Rb2, Rb3, and Rb4. The anode of the diode Db and the collector of the phototransistor Trb1 are connected to the positive output terminal of the buffer 40$fl$. The collector of the transistor Trb2 is connected via the fixed resistor Rb4 to a second output terminal of the vehicle height sensor 32$fl$ which is coupled to a second input terminal of the buffer 42. The internal design of the photo-interrupter 84B is similar to the internal design of the photo-interrupter 84A. The photo-interrupter 84B operates in a way similar to the operation of the photo-interrupter 84A.

The photo-interrupter 84C includes a light-emitting diode Dc, a phototransistor Trc1, an NPN transistor Trc2, and fixed resistors Rc1, Rc2, Rc3, and Rc4. The anode of the diode Dc and the collector of the phototransistor Trc1 are connected to the positive output terminal of the buffer 40$fl$. The collector of the transistor Trc2 is connected via the resistor Rc4 to a third output terminal of the vehicle height sensor 32$fl$ which is coupled to a third input terminal of the buffer 42. The internal design of the photo-interrupter 84C is similar to the internal design of the photo-interrupter 84A. The photo-interrupter 84C operates in a way similar to the operation of the photo-interrupter 84A.

The photo-interrupter 84D includes a light-emitting diode Dd, a phototransistor Trd1, an NPN transistor Trd2, and fixed resistors Rd1, Rd2, Rd3, and Rd4. The anode of the diode Dd and the collector of the phototransistor Trd1 are connected to the positive output terminal of the buffer 40$fl$. The collector of the transistor Trd2 is connected via the resistor Rd4 to a fourth output terminal of the vehicle height sensor 32$fl$ which is coupled to a fourth input terminal of the buffer 42. The internal design of the photo-interrupter 84D is similar to the internal design of the photo-interrupter 84A. The photo-interrupter 84D operates in a way similar to the operation of the photo-interrupter 84A.

The first, second, third, and fourth input terminals of the buffer 42 are directly connected to first, second, third, and fourth output terminals of the buffer 42. A power input terminal of the buffer 42 is connected to the first, second, third, and fourth input terminals of the buffer 42 via first, second, third, and fourth fixed resistors Ra, Rb, Rc, and Rd respectively. A postive power supply voltage Vb is applied to the power input terminal of the buffer 42. When the transistor Tra2 within the photo-interrupter 84A is conductive or ON, a current flows through the resistors Ra and Ra4, and the transistor Tra2 so that the first output terminal of the buffer 42 assumes a low level state due to a voltage drop across the resistor Ra. When the transistor Tra2 is unconductive or OFF, a current does not flow through the resistors Ra and Ra4, and the transistor Tra2 so that the the output terminal of the buffer 42 assumes a high level state.

Similarly, the second, third, and fourth output terminals of the buffer 42 move between a high level state and a low level state when the associated transistors Trb2, Trc2, and Trd2 within the photo-interrupters 84B, 84C, and 84D move between an OFF state and an ON state.

When the buffer 40fl outputs a drive signal S12 to the vehicle height sensor 32fl and thus the sensor 32fl is activated, the phototransistors Tra1–Trd1 within the photo-interrupters 84A–84D are turned on or off in accordance with the vehicle height. The transistors Tra2–Trd2 assume an ON state or an OFF state in correspondence with the states of the associated phototransistors Tra1–Trd1. The first, second, third, and fourth output terminals of the buffer 42 assume a low level state or a high level state in accordance with the states of the associated transistors Tra2–Trd2. In other words, the vehicle height signal S7 (see FIG. 1) depending on the states of the phototransistors Tra1–Trd1 and thus representing the vehicle height is transmitted from the output terminals of the sensor 32fl to the input terminals of the buffer 42. The buffer 42 generates and outputs a four-bit digital signal via its output terminals in accordance with the input vehicle height signal S7. The digital output signal from the buffer 42 is transmitted to the input port 52 (see FIG. 2).

As described previously, the first, second, third, and fourth output terminals of each of the other vehicle height sensors 32fr and 32R (see FIGS. 1 and 2) are connected to the first, second, third, and fourth input terminals of the buffer 42. The digital output signal from the buffer 42 depends on the vehicle height signals S8 and S9 in a manner similar to the case of the vehicle height signal S7.

As described previously, the control circuit 36 adjusts the actual vehicle height in accordance with the vehicle running conditions including the detected vehicle heights and the detected vehicle speed derived from the signals S7–S10 outputted by the sensors 32fl, 32fr, 32R, and 34. The control circuit 36 also detects malfunctions of the vehicle height sensors 32fl, 32fr, and 32R.

Figure 5:
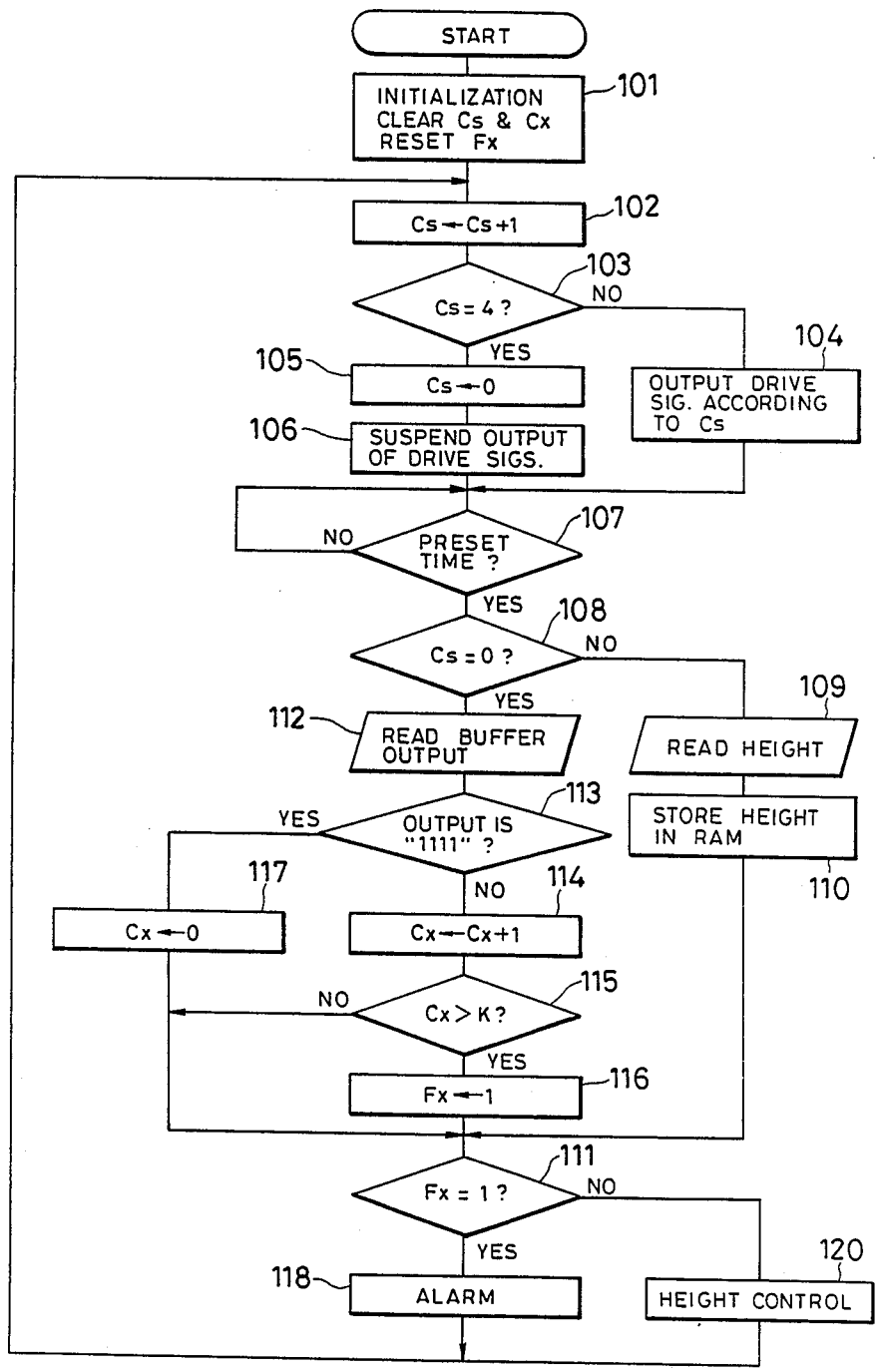
FIG. 5 is a flowchart of a malfunction detecting program operating the control circuit of FIGS. 1 and 2.

The control circuit 36 operates in accordance with a program held in the ROM 58. A main routine of the program includes a malfunction detecting program. FIG. 5 is a flowchart of the malfunction detecting program.

As shown in FIG. 5, a first step of the program initializes the values represented by variables. Specifically, the values Cs and Cx represented by outputs of counters within the control circuit 36 are cleared to "0". The flag or value Fx is reset to "0". After the step 101, the program advances to a step 102.

The step 102 increments the value Cs by "1". In other words, "Cs=Cs+1" is executed. After the step 102, the program advances to a step 103.

The step 103 determines whether or not the value Cs equals "4". When the value Cs does not equal "4", the program advances to a step 104. When the value Cs equals "4", the program advances to a step 105. Since the value Cs equal to "4" is chosen to indicate when a malfunction detecting process is to be executed, the program advances to the step 105 when a malfunction detecting process is to be executed. In other cases, the program advances to the step 104. As will be made clear hereinafter, the vehicle height sensor to be next driven or activated is denoted by the value Cs. Specifically, the values Cs equal to "1", "2", and "3" represent that the vehicle height sensors 32fl, 32fr, and 32R are to be next driven, respectively.

The step 104 adjusts the buffers 40fl, 40fr, and 40R (see FIG. 2) to output the drive signals S12, S13, and S14 in accordance with the value Cs. Specifically, when the value Cs equals "1", the drive signal S12 is outputted to the vehicle height sensor 32fl so that the sensor 32fl is activated. When the value Cs equals "2", the drive signal S13 is outputted to the vehicle height sensor 32fr so that the sensor 32fr is activated. When the value Cs equals "3", the drive signal S14 is outputted to the vehicle height sensor 32R so that the sensor 32R is activated. After the step 104, the program proceeds a step 107.

The step 105 clears the value Cs to "0". Accordingly, the value Cs equal to "0" now indicates when a malfunction detecting process is to be executed. After the step 105, the program proceeds to a step 106.

The step 106 interrupts or suspends the outputs of the drive signals S12–S14 to the vehicle height sensors. After the step 106, the program advances to the step 107.

The step 107 waits for a preset interval of time. Specifically, the time elapsed since the moment of the first advance of the program into the step 107 is compared with the preset interval. The step 107 reiterates until this time elapsed reaches the preset interval. When this time elapsed reaches the preset interval, the program moves from the step 107. The preset interval is preferably 2 milliseconds.

A step 108 following the step 107 determines whether or not the value Cs equals "0". When the value Cs does not equal "0", the program advances to a step 109. When the value Cs equals "0", the program advances to a step 112. Since the value Cs equal to "0" indicates when a malfunction detecting process is to be executed, the program advances to the step 112 when a malfunction detecting process is to be executed. In other cases, the program advances to the step 109.

The step 109 derives the detected vehicle hight value from one of the vehicle height signals S7–S9 outputted by the vehicle height sensor presently driven by the previous step 104. Specifically, the vehicle height values are derived from the signals S7, S8, and S9 when the vehicle height sensors 32fl, 32fr, and 32R are activated by the step 104 respectively.

A step 110 following the step 109 stores the derived vehicle height value in a preset area of the RAM 60 (see FIG. 2). After the step 110, the program advances to a step 111.

The step 112 reads the state of the four-bit digital signal outputted from the buffer 42. As understood from the previous description relating to FIG. 4, the state of the four-bit signal from the buffer 42 reflects the voltages of the four output terminals of each of the vehicle height sensors 32fl, 32fr, and 32R. When all the vehicle height sensors are deactivated, that is, when all the drive signals S12–S14 are absent, the four output terminals of each of the vehicle height sensors normally assume high level states so that all the four bits of the digital signal outputted by the buffer 42 normally assume "1". In cases where one or more of the emitter-collector paths of the transistors Tra2–Trd2 (see FIG. 4) within at least one of the vehicle height sensors short-circuit so that at least one of the sensors malfunctions, at least one of the bits of the digital signal from the buffer 42 assumes "0" even when the drive signals S12–S14 are absent. Also, in cases where the output terminal or terminals of at least one of the vehicle height sensors short-circuit to the ground due to other troubles, at least one of the bits of the digital signal from the buffer 42 assumes "0" even when the drive signals S12–S14 are absent.

A step 113 following the step 112 determines whether or not all the bits of the output signal from the buffer 42 are "1", that is, whether or not the output signal from the buffer 42 is "1111". When the output signal from the buffer 42 is "1111", that is, when all the vehicle height sensors 32fl, 32fr, and 32R are judged to be normal, the program advances to a step 117. When the output signal from the buffer 42 is not "1111", that is, when at least one of the vehicle height sensors 32fl 32fr, and 32R is judged to be wrong, the program advances to a step 114.

The step 114 increments the value Cx by "1". In other words, "Cx=Cx+1" is executed. Accordingly, the value Cx represents the number of times of consecutive detections of a vehicle hight sensor malfunction. After the step 114, the program advances to a step 115.

The step 115 compares the value Cx with a preset value K equal to or more than "1". When the value Cx is equal to or less than the preset value K, the program jumps to the step 111. When the value Cx exceeds the preset value K, the program advances to a step 116.

The step 116 sets the malfunction detection flag or value Fx to "1". After the step 116, the program advances to the step 111.

The step 117 clears the value Cx to "0". After the step 117, the program advances to the step 111.

The step 111 determines whether or not the malfunction detection flag Fx is set, that is, whether or not the value Fx is "1". When the flag Fx is set, the program advances to a step 118. When the flag Fx is not set, the program advances to a step 120.

The step 118 outputs an active control signal S11 to the alarm 37 (see FIGS. 1 and 2) so that the alarm 37 is energized. The energization of the device 37 alarms that at least one of the vehicle height sensors 32fl, 32fr, and 32R malfunctions. After the step 118, the program returns to the step 102.

The step 120 executes vehicle height control process. After the step 120, the program returns to the step 102.

Thus, in cases where a malfunction of at least one of the vehicle height sensors 32fl, 32fr, and 32R has been consecutively detected a number of times greater than the preset number K in the step 113, the alarm 37 is energized to represent the malfunction of the vehicle height sensor or sensors. This detection or alarm of a malfunction of the vehicle height sensor or sensors is more reliable than the case where the alarm 37 is energized when a malfunction is detected by the step 113 only once.

While the alarm 37 is energized to represent a malfunction of the vehicle height sensor or sensors, the vehicle height control step 120 fails to be executed so that the vehicle height control is interrupted. Accordingly, the vehicle height control is prevented from responding to the erroneous signal from the wrong vehicle height sensor.

Figure 6:
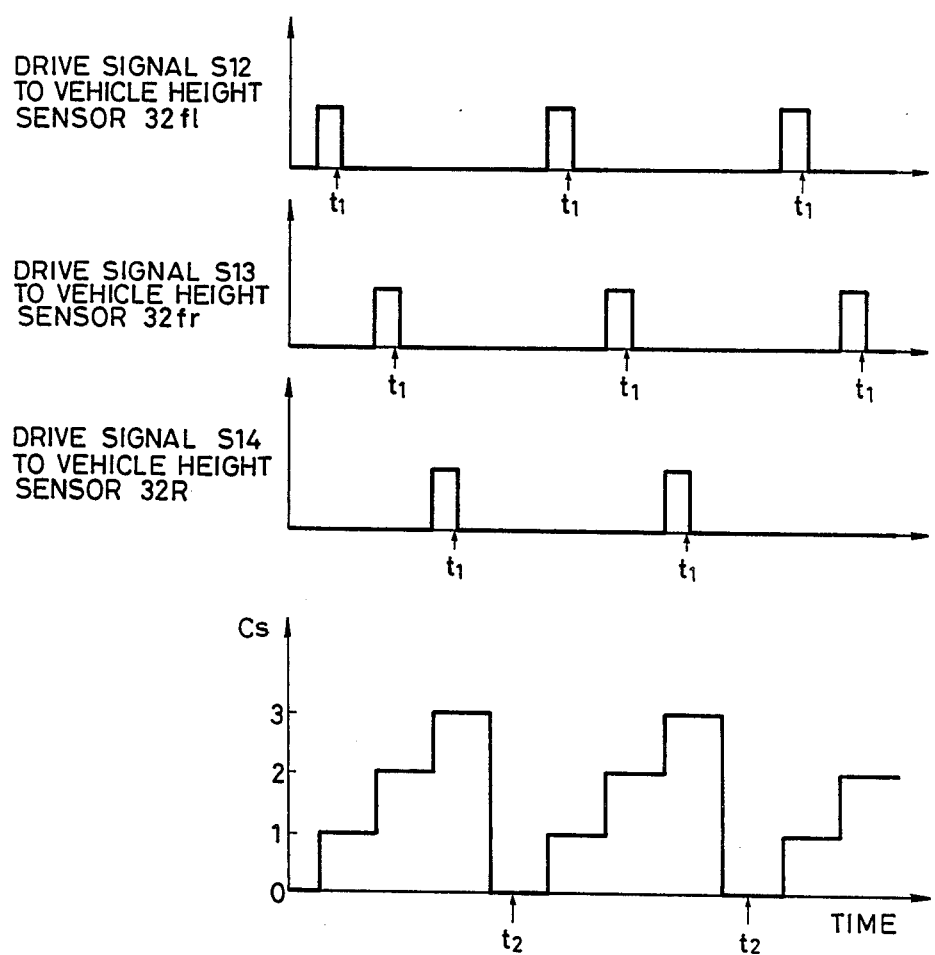
FIG. 6 is a time chart of signals generated in the vehicle height detecting system of FIG. 1.

As shown in FIG. 6, the vehicle height sensor drive signals S12, S13, and S14 are outputted sequentially in accordance with the value Cs. Specifically, the drive signal S12 for the vehicle height sensor 32fl is outputted when the value Cs is "1". The drive signal S13 for the vehicle height sensor 32fr is outputted when the value Cs is "2". The drive signal S14 for the vehicle height sensor 32R is outputted when the value Cs is "3".

At moments t1 within periods during which the vehicle height sensor drive signals S12–S14 last, the vehight height detection signals S7–S9 are sampled and the sampled vehicle height values are stored in the RAM 60 (see FIG. 2).

At moments t2 within periods during which the value Cs is "0" and all the vehicle height sensor drive signals S12–S14 are absent, the four-bit digital signal outputted by the buffer 42 (see FIGS. 2 and 4) is sampled and a determination is made as to whether or not at least one of the vehicle height sensors 32fl, 32fr, and 32R malfunctions on the basis of this sampled signal data. As described previously, in cases where all the vehicle height sensors 32fl, 32fr, and 32R are normal, when all the drive signals S12–S14 are absent, the four-bit digital signal from the buffer 42 is "1111". A malfunction of the vehicle height sensor or sensors is detected and alarmed on the basis of a deviation of the four-bit digital signal from the state "1111" under conditions where all the drive signals S12–S14 are absent.

In this way, the sensor malfunction detecting process is executed during absence of all the sensor drive signals S12–S14, so that all the different states of each of the four-bit vehicle height signals S7–S9 outputted during presence of the sensor drive signals S12–S14 can be used or alloted for representations of the vehicle height. Accordingly, the sensor malfunction detecting process can be performed without reducing the resolving power of the vehicle height detection.

It should be noted that modifications may be made in this invention. For example, each of the vehicle height sensors may be of the type including a projection-equipped rotatable disc and reed switches movable between an ON state and an OFF state in accordance with the position of the projection or projections. Furthermore, each of the vehicle height sensors may be of the other types having separate output terminals, the electrical states of which move between an ON state and an OFF state in accordance with the vehicle height.

What is claimed is:
1. A vehicle height detecting system comprising:
 (a) a vehicle height sensor including switching circuits which are turned on and off in accordance with height of a vehicle;
 (b) means for outputting a drive signal to the vehicle height sensor and thereby driving the vehicle height sensor;
 (c) means for feeding a present voltage to terminals of the respective switching circuits and outputting voltages at the terminals as vehicle height data having bits corresponding to the respective switching circuits;
 (d) means for, when the driving means suspends the output of the drive signal, reading the vehicle height data as vehicle height sensor malfunction detecting data; and;
 (e) means for comparing the malfunction detecting data with preset reference data and judging the vehicle height sensor to be wrong when the malfunction detecting data differ from the preset reference data.

2. The system of claim 1 further comprising means for alarming when the vehicle height sensor is judged to be wrong.

3. A vehicle height detecting system comprising:
 (a) vehicle height sensors each of which includes switching circuits turned on and off in accordance with height of a vehicle;

(b) means for outputting drive signals to the vehicle height sensors sequentially and thereby driving the vehicle height sensors in turn;

(c) means for feeding a preset voltage to terminals of each of the vehicle height sensors and outputting voltages at the terminals of each of the vehicle height sensors as vehicle height data having bits corresponding to the respective switching circuits in each of the vehicle height sensors;

(d) means for, when the driving means suspends the output of each of the drive signals, reading the vehicle height data as vehicle height sensor malfunction detecting data; and (e) means for comparing the malfunction detecting data with preset reference data and judging at least one of the vehicle height sensors to be wrong when the malfunction detecting data differ from the preset reference data.

4. The system of claim 3 further comprising means for alarming when at least one of the vehicle height sensors is judged to be wrong.

5. A system comprising:
a sensor for detecting height of a vehicle;
means for selectively activating and deactivating the sensor;
means for monitoring a condition of the sensor when the sensor is deactivated; and
means for detecting a malfunction of the sensor on the basis of the monitored condition of the sensor, wherein the sensor includes an output terminal via which a signal representative of the detected vehicle height is outputted, and the monitoring means is operative to monitor an electrical condition of the output terminal of the sensor.

6. A system comprising:
a sensor for detecting height of a vehicle;
means for selectively activating and deactivating the sensor;
means for monitoring a condition of the sensor when the sensor is deactivated; and
means for detecting a malfunction of the sensor on the basis of the monitored condition of the sensor, wherein the malfunction detecting means comprises means for comparing the monitored condition of the sensor with a reference condition corresponding to a normal state of the sensor, and means for judging the sensor to be wrong when the monitored condition differs from the reference condition.

7. A system comprising:
a sensor for detecting height of a vehicle;
means for selectively activating and deactivating the sensor;
means for monitoring a condition of the sensor when the sensor is deactivated;
means for detecting a malfunction of the sensor on the basis of the monitored condition of the sensor; and
means for alarming when the malfunction of the sensor is detected.

* * * * *